Nov. 2, 1937.   F. HOLLADAY   2,097,978
MEAT HOOK
Filed Feb. 24, 1937   2 Sheets-Sheet 1
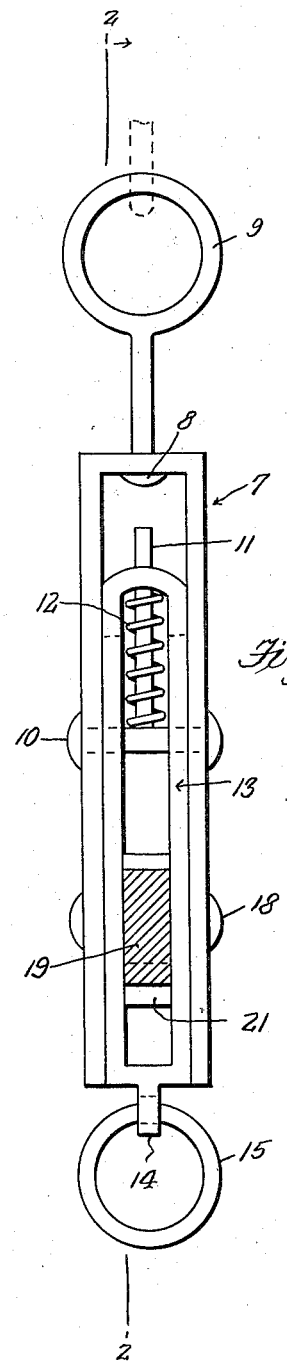
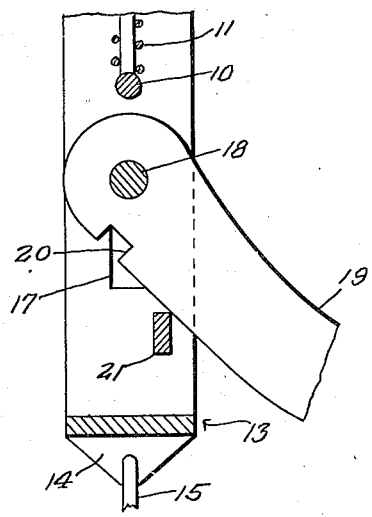
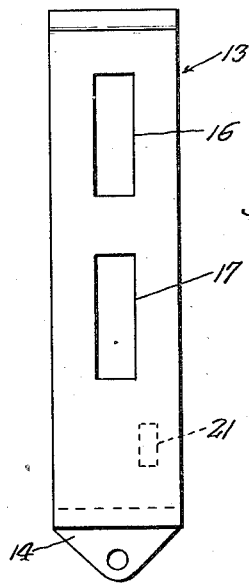
Inventor
*Frank Holladay.*
By *Clarence A. O'Brien*
*Hyman Berman*
Attorneys Nov. 2, 1937.  F. HOLLADAY  2,097,978
MEAT HOOK
Filed Feb. 24, 1937  2 Sheets-Sheet 2
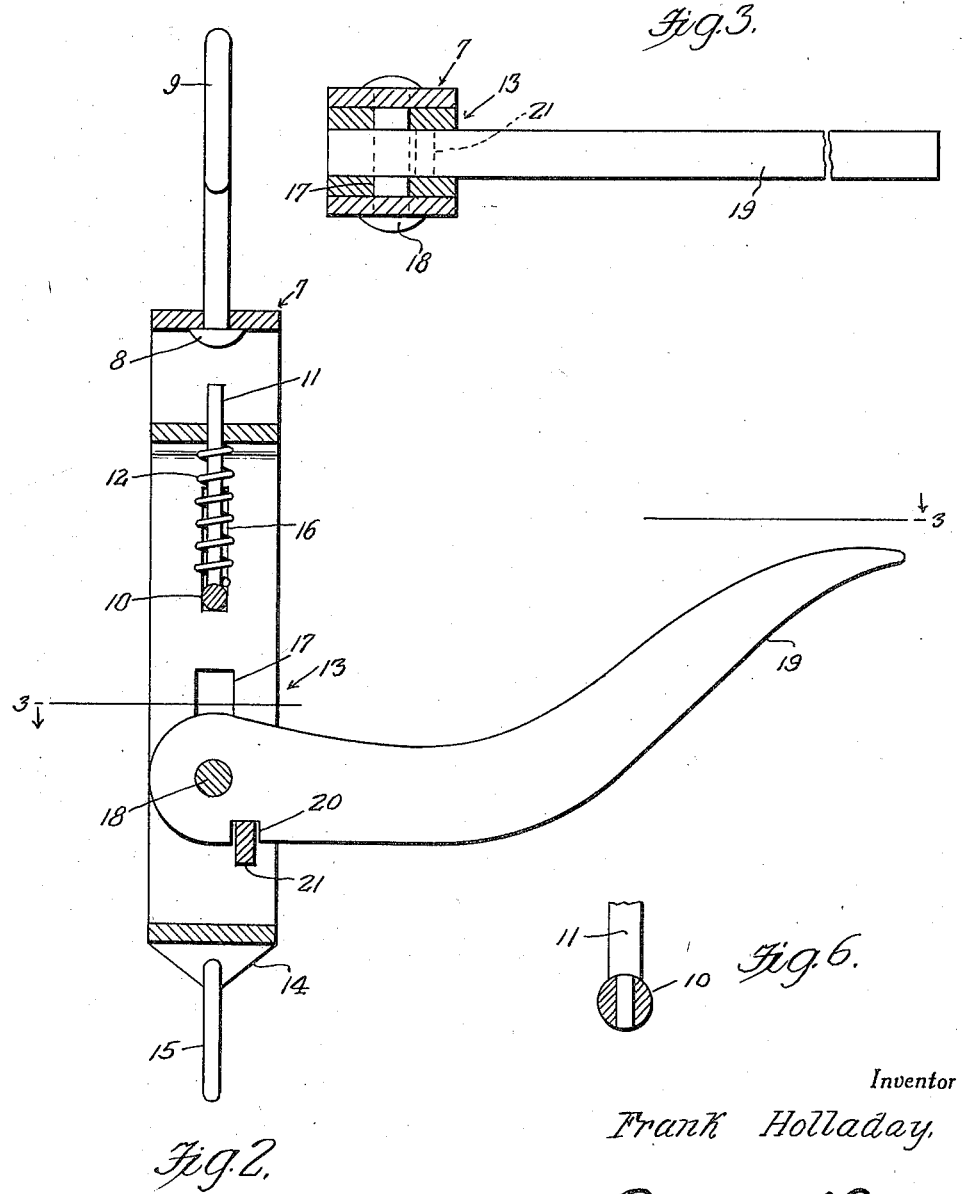
Inventor
Frank Holladay,
By Clarence A. O'Brien
Hyman Berman
Attorneys Patented Nov. 2, 1937

2,097,978

UNITED STATES PATENT OFFICE 2,097,978

MEAT HOOK

Frank Holladay, Alton, Ill.

Application February 24, 1937, Serial No. 127,535

5 Claims. (Cl. 248—306)

This invention relates to what is believed to be a new and novel meat hook construction of a type satisfactorily usable in meat markets, cold storage rooms in packing houses, and similar places of business, where comparatively cumbersome and heavy quarters of beef or the like are suspended for convenient selection and commercial purposes.

In carrying out and reducing to practice the inventive principles of the present conception, I have evolved and produced a simple and practicable mechanical structure characterized by a suspension yoke, and a relatively slidable spring retained trip associated therewith, said trip being cooperable with a pivoted meat hook in the manner and for the purposes described.

Stated otherwise, I have found it expedient and practicable to provide a yoke-like member, to equip it with a pivoted hook to facilitate sliding of the hunk of meat therefrom, there being associated with the hook and yoke a remote rope or cable controlled spring retained trip unit operable in a reliable and satisfactory manner.

Other features and advantages will become more readily apparent from the following description and drawings.

In the drawings:

Figure 1 is an elevational view, partly in section, of a meat hook contrivance constructed in accordance with my personal ideas.

Figure 2 is a vertical sectional view taken approximately on the plane of the line 2—2 of Figure 1.

Figure 3 is a section on the irregular line 3—3 of Figure 2.

Figure 4 is a view based on Figure 2 showing the position of the hook after it is tripped and allowed to swing down to meat releasing position.

Figure 5 is a detail elevational view of the slide or trip unit.

Figure 6 is a detail view of the spring adapter.

As seen in Figure 1, the numeral 7 designates a hanger or suspension yoke, the same being approximately U-shaped in form. Swivelly attached to the bight portion thereof, as indicated at 8, is a suspension ring 9 designed to cooperate with a roller-equipped track or carriage such as is sometimes used in packing houses to facilitate shifting beef quarters from place to place. The arms of the yoke intermediate the ends are provided with a horizontal cross-pin 10 having an upstanding guide stem 11 arranged centrally and parallel between said arms. These features 10 and 11 provide a substantially T-shaped member to accommodate a coiled automatically operable expansion or return spring 12 for the slidable trip unit 13. This trip unit is in the form of a rectangular frame fashioned to fit slidably between the arms of the yoke. At its lower end it is provided with a depending lug 14 carrying a finger-ring 15. The ring 15 can be actuated by the finger within convenient reach of the attendant or a cord or rope (not shown) may be attached thereto for remote control work. The upper end portion of the frame is apertured to accommodate the stem or guide member. Then, too, the spaced parallel side portions are provided with upper and lower elongated slots 16 and 17. The slots 16 cooperate with the relatively stationary pin 10. The slots 17 slidably coact with the pivot pin or journal 18 for the meat hook 19. This part 19 is appropriately shaped to provide for natural gravitation and relief of the block of meat. Adjacent the inner end the hook 19 is provided with a keeper notch 20 engageable with a keeper member 21 on the slidable trip unit. This feature 21 may also be called a detent.

Normally, the hook 19 is at right angles to the parts 7 and 13 as a unit as seen in Figure 2. At this time the notch 20 engages over the detent 21. The spring 12 holds the trip unit 13 up and within the confines of the yoke. Also, it counterbalances the weight of the hook and the meat hung thereon. Obviously, however, by exerting a downward pull on the ring 15 either directly or by way of a rope, the tension of the spring 12 can be overcome. At the same time the detent 21 is released from the keeper notch 20 allowing hook 19 to swing down to the meat releasing inclined position shown in Figure 4. This literally chutes the meat conveniently on to the shoulder of the waiting attendant and overcomes the hazards and disadvantages accompanying present day meat hook construction and practices.

As the spring returned unit or slide 13 is released, it is obvious that it automatically lifts the hook 19 causing the parts to resume the normal or set position disclosed in Figure 2.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structural assemblage of the class described, a relatively stationary section, a hook pivotally mounted thereon, a relatively movable section slidably associated with the first-named section and provided with a detent engageable with said hook, and spring means between the sections maintaining said sections in a predetermined order and relationship to hold the hook in a normal meat suspending position.

2. In a meat hook construction of the class described, a yoke, a slide mounted in said yoke, spring means mounted on the yoke and engageable with the slide to hold it in a normally retracted position, a hook pivotally mounted on the yoke and swingably associated with the slide, said hook having a keeper notch, and said slide having a detent releasably engageable with said notch.

3. In a meat hook construction of the class described, a substantially U-shaped yoke, an open frame slide mounted between the arms of said yoke, a T-shaped spring adapter carried by said yoke and including a stem, a coiled spring surrounding said stem, a hook pivotally mounted between the arms of the yoke, a retractable and projectable slide mounted between said arms, said slide being in the nature of a rectangular frame having one end apertured for passage of said guide stem, said hook being provided with a keeper notch, and said slide being provided with a keeper element releasably engageable with said notch in the manner and for the purposes described.

4. A device of the class described comprising a vertically arranged member, a hook pivoted to said member and normally extending at substantially right angles therefrom, a second vertically arranged member slidably supported by the first member and having a projection thereon for engaging a part of the hook to hold the hook in raised position when the second member is in raised position, spring means for normally holding the second member in raised position, and means whereby the second member can be manually lowered to move the projection to permit the hook to move to lowered position.

5. A device of the class described comprising a vertically arranged yoke, a hook pivoted therein, said hook having a notch in its under edge adjacent the pivotal point, a slide supported in the yoke for sliding movement and having an opening therein through which the hook passes, a projection on the slide for engaging the notch to hold the hook in raised position, spring means for normally holding the slide in raised position with the projection engaging the notch, and means whereby the slide can be moved to lowered position against the action of the spring means for moving the projection out of the notch, the hook then moving to lowered position with a part of its under edge resting against the projection.

FRANK HOLLADAY.